US009412217B2

(12) United States Patent
Kijowski et al.

(10) Patent No.: US 9,412,217 B2
(45) Date of Patent: Aug. 9, 2016

(54) MEDICATION DISPENSING APPARATUS HAVING CONVEYED CARRIERS

(75) Inventors: Todd Kijowski, Natrona Heights, PA (US); Paul Santmyer, Canonsburg, PA (US)

(73) Assignee: Aesynt Incorporated, Cranberry, PA (US)

( * ) Notice: Subject to any disclaimer, the term of this patent is extended or adjusted under 35 U.S.C. 154(b) by 959 days.

(21) Appl. No.: 13/076,549

(22) Filed: Mar. 31, 2011

(65) Prior Publication Data

US 2012/0248947 A1 Oct. 4, 2012

(51) Int. Cl.

| | |
|---|---|
| ***A47F 1/04*** | (2006.01) |
| ***B65G 17/12*** | (2006.01) |
| ***A47B 88/04*** | (2006.01) |
| ***G07F 11/60*** | (2006.01) |
| *G07F 17/00* | (2006.01) |

(52) U.S. Cl.
CPC ............ *G07F 11/60* (2013.01); *A61G 2205/10* (2013.01); *G07F 17/0092* (2013.01)

(58) Field of Classification Search
USPC ........... 221/69, 75, 76, 82, 83, 86, 89, 91, 92, 221/119, 120, 121, 133
See application file for complete search history.

(56) References Cited

U.S. PATENT DOCUMENTS

| | | | | |
|---|---|---|---|---|
| 4,717,042 | A | 1/1988 | McLaughlin | |
| 4,785,969 | A | 11/1988 | McLaughlin | |
| 4,847,764 | A | 7/1989 | Halvorson | |
| 5,014,875 | A | 5/1991 | McLaughlin et al. | |
| 5,042,233 | A * | 8/1991 | Huang et al. | 53/468 |
| 5,190,185 | A | 3/1993 | Blechl | |
| 5,292,029 | A | 3/1994 | Pearson | |
| 5,314,243 | A | 5/1994 | McDonald et al. | |
| 5,346,297 | A | 9/1994 | Colson, Jr. et al. | |
| 5,377,864 | A | 1/1995 | Blechl et al. | |
| 5,405,048 | A | 4/1995 | Rogers et al. | |
| 5,431,299 | A | 7/1995 | Brewer et al. | |
| 5,460,294 | A | 10/1995 | Williams | |
| 5,468,110 | A | 11/1995 | McDonald et al. | |

(Continued)

OTHER PUBLICATIONS

Ezy-Dose 7 Day AM/PM Push Button Pill Reminder [online] [retrieved Feb. 18, 2011]. Retrieved from the Internet: <URL: http://www.medichest.com/ezy-dose7dayampmpushbuttonpillreminderea.html>. 1 page.

(Continued)

*Primary Examiner* — Gene Crawford
*Assistant Examiner* — Kelvin L Randall, Jr.
(74) *Attorney, Agent, or Firm* — Alston & Bird LLP

(57) ABSTRACT

A medication dispensing cabinet and an associated medication dispensing drawer assembly are provided in order to controllably convey and dispense medication. A medication dispensing cabinet may include a cabinet body, a plurality of drawers disposed within and configured for slidable extension relative to the cabinet body, a conveyor belt disposed within a first drawer and a plurality of bins operably connected to the conveyor belt and configured to receive medication for movement with the conveyor belt. Each bin may includes an openable support surface which, in one embodiment, is biased to open. In addition, the first drawer may define an opening and the conveyor belt may be configured to move a respective bin into alignment with the opening. The support surface of the respective bin may then be permitted to open and the medication carried by the respective bin may be dispensed through the opening.

17 Claims, 5 Drawing Sheets

(56) References Cited

U.S. PATENT DOCUMENTS

| | | | |
|---|---|---|---|
| 5,480,062 A | 1/1996 | Rogers et al. | |
| 5,520,450 A | 5/1996 | Colson, Jr. et al. | |
| 5,564,803 A | 10/1996 | McDonald et al. | |
| 5,593,267 A | 1/1997 | McDonald et al. | |
| 5,661,978 A | 9/1997 | Holmes et al. | |
| D384,578 S | 10/1997 | Wangu et al. | |
| 5,713,485 A | 2/1998 | Liff et al. | |
| 5,716,114 A | 2/1998 | Holmes et al. | |
| 5,745,366 A | 4/1998 | Higham et al. | |
| 5,761,877 A | 6/1998 | Quandt | |
| 5,797,515 A | 8/1998 | Liff et al. | |
| 5,805,456 A | 9/1998 | Higham et al. | |
| 5,842,976 A | 12/1998 | Williamson | |
| 5,878,885 A | 3/1999 | Wangu et al. | |
| 5,880,443 A | 3/1999 | McDonald et al. | |
| 5,883,806 A | 3/1999 | Meador et al. | |
| 5,893,697 A | 4/1999 | Zini et al. | |
| 5,905,653 A | 5/1999 | Higham et al. | |
| 5,912,818 A | 6/1999 | McGrady et al. | |
| 5,927,540 A | 7/1999 | Godlewski | |
| 5,940,306 A | 8/1999 | Gardner et al. | |
| 5,971,593 A | 10/1999 | McGrady | |
| 6,003,006 A | 12/1999 | Colella et al. | |
| 6,011,999 A | 1/2000 | Holmes | |
| 6,021,392 A | 2/2000 | Lester et al. | |
| 6,039,467 A | 3/2000 | Holmes | |
| 6,065,819 A | 5/2000 | Holmes et al. | |
| 6,068,156 A | 5/2000 | Liff et al. | |
| 6,109,774 A | 8/2000 | Holmes et al. | |
| 6,112,502 A | 9/2000 | Frederick et al. | |
| 6,116,461 A | 9/2000 | Broadfield et al. | |
| 6,151,536 A | 11/2000 | Arnold et al. | |
| 6,170,230 B1 | 1/2001 | Chudy et al. | |
| 6,176,392 B1 | 1/2001 | William et al. | |
| 6,189,727 B1 | 2/2001 | Shoenfeld | |
| 6,223,934 B1 | 5/2001 | Shoenfeld | |
| 6,256,967 B1 | 7/2001 | Hebron et al. | |
| 6,283,322 B1 | 9/2001 | Liff et al. | |
| 6,289,656 B1 | 9/2001 | Wangu et al. | |
| 6,338,007 B1 | 1/2002 | Broadfield et al. | |
| 6,339,732 B1 | 1/2002 | Phoon et al. | |
| 6,361,263 B1 | 3/2002 | Dewey et al. | |
| 6,370,841 B1 | 4/2002 | Chudy et al. | |
| 6,449,927 B2 | 9/2002 | Hebron et al. | |
| 6,471,089 B2 | 10/2002 | Liff et al. | |
| 6,497,342 B2 | 12/2002 | Zhang et al. | |
| 6,499,270 B2 | 12/2002 | Peroni et al. | |
| 6,532,399 B2 | 3/2003 | Mase | |
| 6,564,121 B1 | 5/2003 | Wallace et al. | |
| 6,581,356 B2 * | 6/2003 | Kim | 53/154 |
| 6,581,798 B2 | 6/2003 | Liff et al. | |
| 6,609,047 B1 | 8/2003 | Lipps | |
| 6,611,733 B1 | 8/2003 | De La Huerga | |
| 6,625,952 B1 | 9/2003 | Chudy et al. | |
| 6,640,159 B2 | 10/2003 | Holmes et al. | |
| 6,650,964 B2 | 11/2003 | Spano, Jr. et al. | |
| 6,671,579 B2 | 12/2003 | Spano, Jr. et al. | |
| 6,681,149 B2 | 1/2004 | William et al. | |
| 6,742,671 B2 | 6/2004 | Hebron et al. | |
| 6,755,931 B2 | 6/2004 | Vollm et al. | |
| 6,760,643 B2 | 7/2004 | Lipps | |
| 6,776,304 B2 | 8/2004 | Liff et al. | |
| 6,785,589 B2 | 8/2004 | Eggenberger et al. | |
| 6,790,198 B1 | 9/2004 | White et al. | |
| 6,814,254 B2 | 11/2004 | Liff et al. | |
| 6,814,255 B2 | 11/2004 | Liff et al. | |
| 6,847,861 B2 | 1/2005 | Lunak et al. | |
| 6,874,684 B1 | 4/2005 | Denenberg et al. | |
| 6,892,780 B2 | 5/2005 | Vollm et al. | |
| 6,895,304 B2 | 5/2005 | Spano, Jr. et al. | |
| 6,975,922 B2 | 12/2005 | Duncan et al. | |
| 6,985,797 B2 | 1/2006 | Spano, Jr. et al. | |
| 6,996,455 B2 | 2/2006 | Eggenberger et al. | |
| 7,010,389 B2 | 3/2006 | Lunak et al. | |
| 7,014,063 B2 | 3/2006 | Shows et al. | |
| 7,016,766 B2 | 3/2006 | William et al. | |
| 7,040,504 B2 | 5/2006 | Broadfield et al. | |
| 7,052,097 B2 | 5/2006 | Meek, Jr. et al. | |
| 7,072,737 B2 | 7/2006 | Lunak et al. | |
| 7,072,855 B1 | 7/2006 | Godlewski et al. | |
| 7,077,286 B2 | 7/2006 | Shows et al. | |
| 7,085,621 B2 | 8/2006 | Spano, Jr. et al. | |
| 7,092,796 B2 | 8/2006 | Vanderveen | |
| 7,093,755 B2 | 8/2006 | Jordan et al. | |
| 7,100,792 B2 | 9/2006 | Hunter et al. | |
| 7,103,419 B2 | 9/2006 | Engleson et al. | |
| 7,111,780 B2 | 9/2006 | Broussard et al. | |
| 7,139,639 B2 | 11/2006 | Broussard et al. | |
| 7,150,724 B2 | 12/2006 | Morris et al. | |
| 7,171,277 B2 | 1/2007 | Engleson et al. | |
| 7,218,231 B2 | 5/2007 | Higham | |
| 7,228,198 B2 | 6/2007 | Vollm et al. | |
| 7,249,688 B2 | 7/2007 | Hunter et al. | |
| 7,348,884 B2 | 3/2008 | Higham | |
| 7,417,729 B2 | 8/2008 | Greenwald | |
| 7,419,133 B2 | 9/2008 | Clarke et al. | |
| 7,426,425 B2 | 9/2008 | Meek, Jr. et al. | |
| 7,554,449 B2 | 6/2009 | Higham | |
| 7,571,024 B2 | 8/2009 | Duncan et al. | |
| 7,588,167 B2 | 9/2009 | Hunter et al. | |
| 7,848,846 B2 * | 12/2010 | Uema et al. | 700/243 |

OTHER PUBLICATIONS

Amazon.com: Apex Weekly Pill Organizer, Twice-a-Day, 1 Pill Organizer (Colors May . . . [online] [retrieved Feb. 18, 2011]. Retrieved from the Internet: <URL: http://www.amazon.com/Apex-Weekly-Organizer-Twice-Colors/dp/B000EGKTEW>. 6 pages.

* cited by examiner

MEDICATION DISPENSING APPARATUS HAVING CONVEYED CARRIERS

TECHNOLOGICAL FIELD

Embodiments of the present invention relate generally to a medication dispensing apparatus and, more particularly, to a medication dispensing apparatus having conveyed carriers for providing controlled movement of the medication.

BACKGROUND

Medication dispensing cabinets have been developed in order to store and controllably dispense a variety of medications. A medication dispensing cabinet may include a cabinet body with one or more drawers that are slidably disposed within the cabinet body. The drawers store the various medications. While some of the drawers may be unlatched and freely extendable, other drawers may be locked in order to more closely control access to the medications stored in the locked drawers.

Some medication dispensing cabinets are automated and, as such, include or are otherwise associated with a computer that controls access to the medications stored within the cabinet. The computer may allow access to only authorized users, such as medical providers who work in the unit in which the medication cabinet is located. Once authorized by the computer, a medical provider may identify a particular medication to be dispensed, such as by reference to the medications prescribed to a respective patient to whom the medical provider is attending. The computer may then facilitate dispensation of the particular medication.

In this regard, a medication dispensing cabinet may include a locked drawer with one or more windows defined by the front face of the drawer through which the dispensed medication may be accessed by the medical provider. The drawer may house a conveyor belt and a plurality of paddles, fins or the like extending outwardly from the conveyor belt. The paddles are generally spaced apart along the conveyor belt so as to define regions between adjacent paddles for receiving medication. By controllably moving the conveyor belt, such as under the direction of the computer associated with the automated medication dispensing cabinet, the medication may be correspondingly moved along a predefined path of movement of the conveyor belt. The path defined by the conveyor belt is generally aligned with a respective window defined by the front face of the drawer. Thus, once the automated medication dispensing cabinet has authorized the medical provider and the dispensation of the medication to the medical provider, the automated medication dispensing cabinet may drive the conveyor belt to move the paddles such that the medication disposed in a respective region between adjacent paddles is presented at the window. The medical provider may then open the window and retrieve the medication. However, the medical provider is limited in regards to the quantity of the medication that may be retrieved since the medical provider is only able to access the quantity of medication, such as a unit dose of medication, disposed within the region between the pair of adjacent paddles that is presented at the window.

In order to move the medication along the path defined by the conveyor belt, the paddles may be curved in the direction of movement of the conveyor belt. In addition, the distal ends of the paddle may be proximate to or may contact the walls of the drawer or other fixed features, such as dividers, partitions or the like within the drawer. During movement of the conveyor belt, the medication may become pinched, wedged, jammed or the like between the paddles and either the floor of the drawer or the walls or other fixed partitions, dividers or the like within the drawer, thereby potentially requiring operator intervention. Additionally, the frictional contact generated by the motion of the medication relative to the floor of the drawer and the walls, partitions, dividers or the like within the drawer may disadvantageously erode the medication over time. In instances in which the medication has a label, for example, the erosion created by the frictional contact between the medication and the floor, walls, dividers, partitions or the like of the drawer may rub off or otherwise cause wear to the label of the medication such that it may thereafter be difficult to identify the medication, at least by means of an automatic label verification technique.

BRIEF SUMMARY

A medication dispensing cabinet and an associated medication dispensing drawer assembly are therefore provided in order to controllably convey and dispense medication. In contrast to techniques that pushed medication along a conveyor belt with paddles or the like, the medication dispensing cabinet and associated medication dispensing drawer assembly of embodiments of the present invention carry the medication. As such, the medication dispensing cabinet and the associated medication dispensing drawer assembly of embodiments of the present invention prevent contact between the medication and the drawer or, more particularly, the floor, wall or other fixed partitions, dividers or the like within the drawer. Accordingly, the medication dispensing cabinet and associated medication dispensing drawer assembly of embodiments of the present invention may reduce or eliminate erosion of the medication including reduction and/or elimination of wear to a label carried by the medication. In addition, the medication dispensing cabinet and associated medication dispensing drawer assembly of embodiments of the present invention may advantageously prevent instances in which the medication may otherwise be pinched, wedged or jammed relative to a drawer, such as the floor, wall or other fixed partition, divider or the like within the drawer.

In one embodiment, a medication dispensing cabinet is provided that includes a cabinet body, a plurality of drawers disposed within and configured for slidable extension relative to the cabinet body, a conveyor belt disposed within a first drawer and a plurality of bins operably connected to the conveyor belt and configured to receive medication for movement with the conveyor belt. Each bin includes an openable support surface which, in one embodiment, is biased to open. In addition, the first drawer defines an opening and the conveyor belt is configured to move a respective bin into alignment with the opening. As such, the support surface of the respective bin is permitted to open and the medication carried by the respective bin is dispensed through the opening.

Each bin may include a wall extending outwardly from and circumferentially about the support surface to thereby define a cavity that is configured to receive the medication. The conveyor belt may be configured for movement in first and second opposite directions. In one embodiment, the medication dispensing cabinet includes a plurality of conveyor belts disposed within the first drawer. The plurality of drawers of a medication dispensing cabinet of one embodiment include a second drawer adjacent to the first drawer. The opening defined by the first drawer opens into the second drawer in accordance with this embodiment such that the medication dispensed through the opening is collected within the second drawer.

In another embodiment, a medication dispensing drawer assembly is provided that includes a drawer having a support surface and a wall extending outwardly from the support surface, a conveyor belt disposed within the drawer and configured for movement, such as in first and second opposite directions, and a plurality of carriers operably connected to the conveyor belt for movement therewith. The carriers are configured to carry medication for movement with the conveyor belt. The carriers limit movement of the medication in a direction away from the conveyor belt to prevent contact between the medication and the housing, thereby avoiding erosion of the medication and wear of a label carried by the medication. By carrying the medication as opposed to pushing the medication, the medication dispensing drawer assembly also avoids pinching, jamming or wedging the medication against the drawer.

The plurality of carriers of one embodiment include a plurality of bins. In this embodiment, each bin may include a support surface and a wall extending outwardly from and circumferentially about the support surface to thereby define the cavity that is configured to receive the medication. The support surface may be configured to limit movement of the medication as a result of gravitational forces and the wall may be configured to limit movement of the medication as a result of centrifugal forces. The support surface of each bin may also be biased to open. The plurality of carriers of another embodiment may include a plurality of clips for directly engaging respective medications.

In a further embodiment, a medication dispensing drawer assembly is provided that includes a drawer, a conveyor belt disposed within the drawer and a plurality of bins operably connected to the conveyor belt for movement therewith. Each bin includes a support surface and a wall extending outwardly from the support surface to thereby define a cavity that is configured to receive medication for movement with the conveyor belt. By carrying the medication within the bins, the medication dispensing drawer assembly avoids disadvantageous contact between the medication and the drawer.

The wall of each bin may extend circumferentially about the support surface. In this embodiment, the support surface may be configured to limit movement of the medication as a result of gravitational forces and the wall may be configured to limit movement of the medication as a result of centrifugal forces. The drawer of this embodiment may have a support surface and a wall extending outwardly from the support surface of the drawer. Each bin of this embodiment may be configured to limit movement of the medication in a direction away from the conveyor belt to prevent contact between the medication and the drawer. The drawer may define an opening and the conveyor belt may be configured to move a respective bin into alignment with the opening. In this embodiment, the support surface of the respective bin may be permitted to open and the medication carried by the respective bin may be dispensed through the opening. In this regard, the support surface of the respective bin may be biased to open.

BRIEF DESCRIPTION OF THE SEVERAL VIEWS OF THE DRAWINGS

Figure 1:
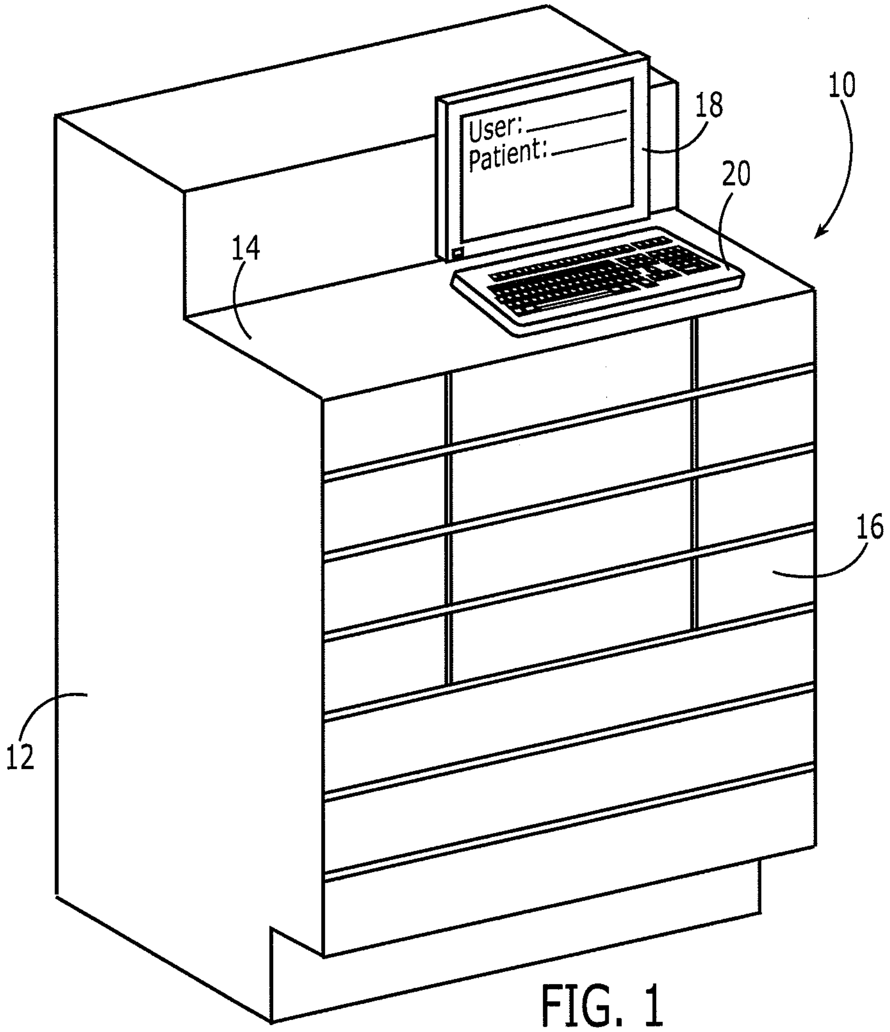
Figure 2:
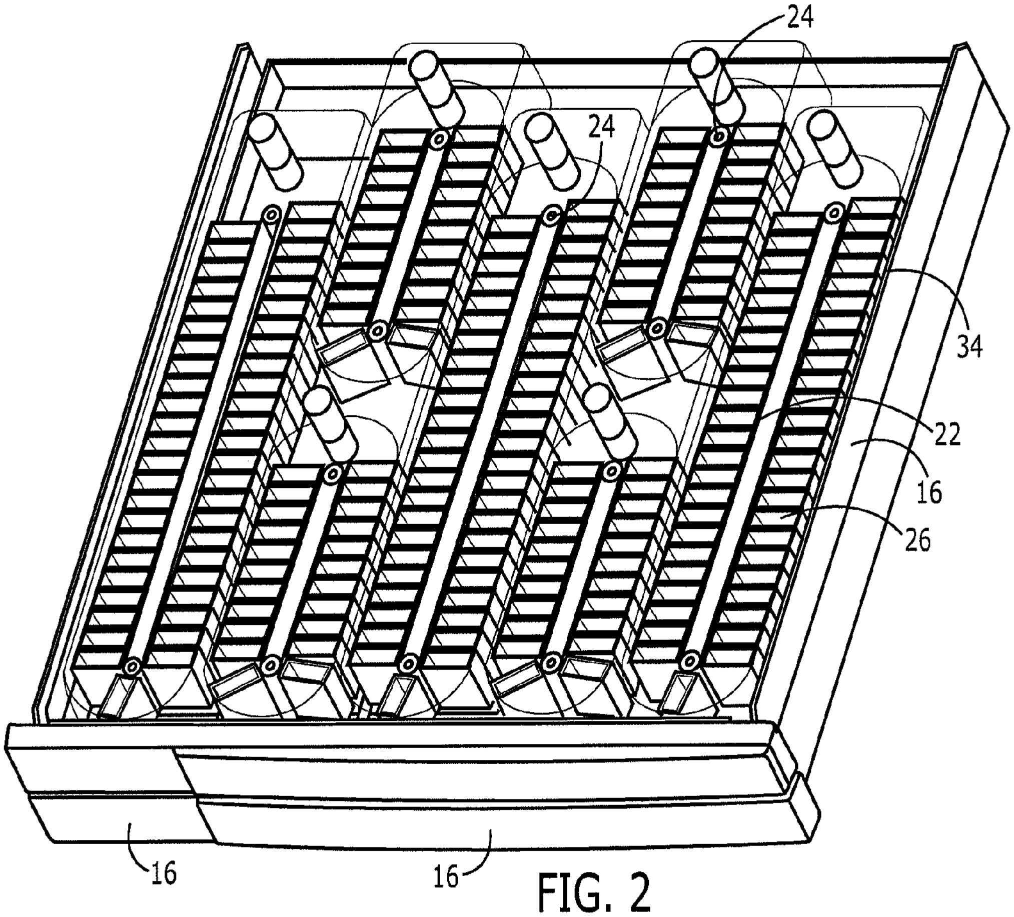
Figure 3:
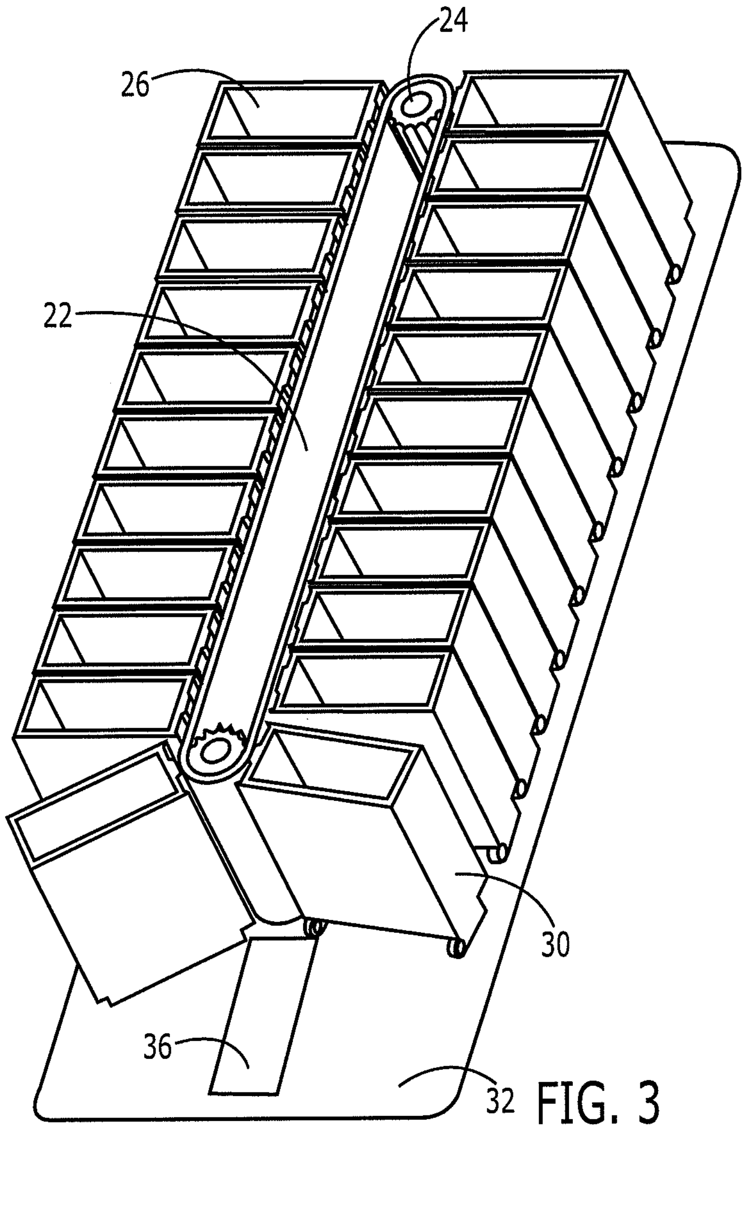
Figure 4:
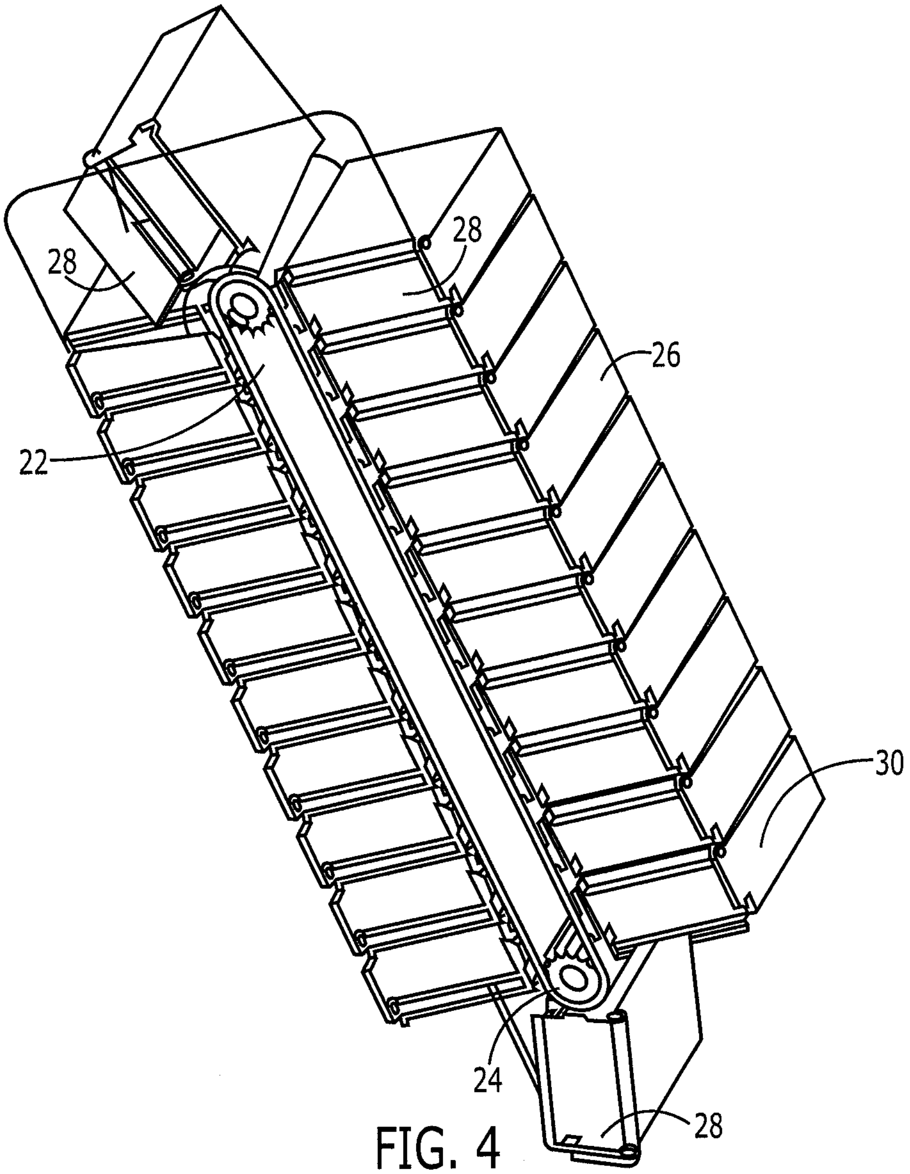
Figure 5:
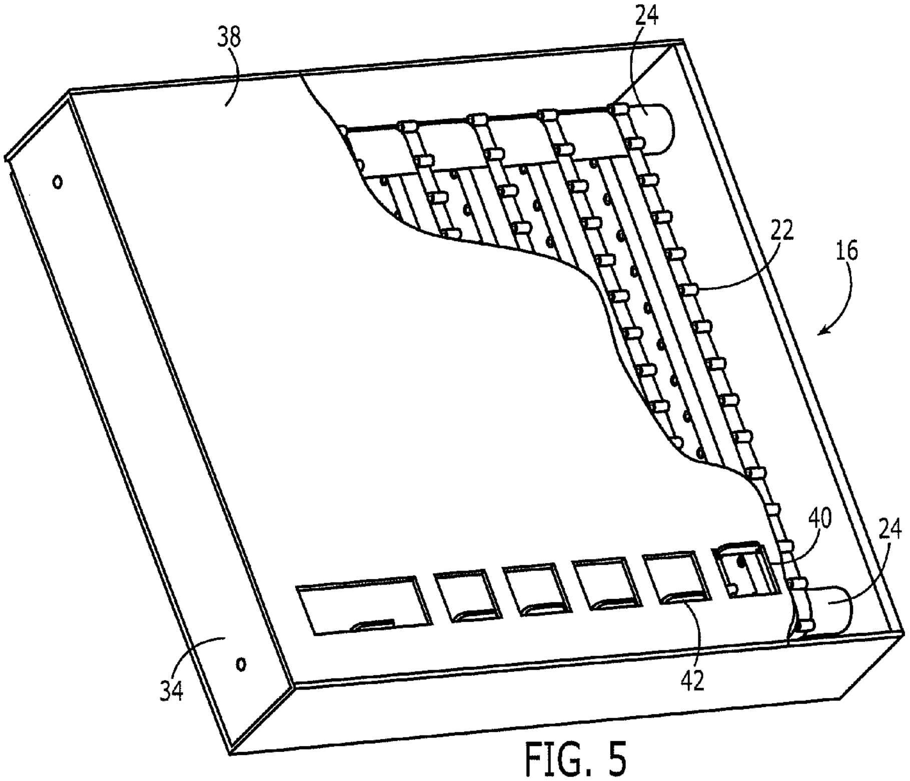
Figure 6:
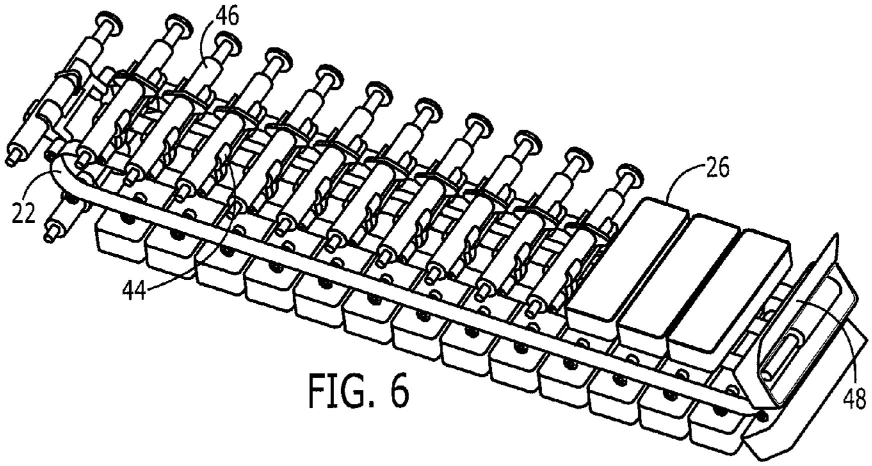

Having thus described embodiments of the invention in general terms, reference will now be made to the accompanying drawings, which are not necessarily drawn to scale, and wherein:

FIG. 1 is a perspective view of a cabinet in accordance with one embodiment of the present invention;

FIG. 2 is a perspective view of a drawer assembly according to one embodiment of the present invention;

FIG. 3 is a perspective view of a portion of a drawer assembly according to one embodiment of the present invention;

FIG. 4 is a perspective view of the portion of the drawer assembly of FIG. 3 taken from the opposite side from that illustrated in FIG. 3;

FIG. 5 is a perspective view of a drawer assembly in accordance with another embodiment of the present invention; and FIG. 6 is a portion of a drawer assembly in accordance with another embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a cabinet 10 for storing a plurality of medications in accordance with one embodiment of the present invention is illustrated. As shown, the cabinet may include the cabinet body 12 having an upper work surface 14 and defining an internal cavity. The cabinet also includes one or more drawers 16 that are slidably disposed within the cabinet body, such as within the internal cavity defined by the cabinet body. The drawers may store various medications and, as described below, may be controlled so as to control access to the medications stored therein. The cabinet of one embodiment may be automated and, as such, may include a computer, such as a personal computer, workstation or the like, for controlling access to the medications stored by the cabinet. As shown in FIG. 1, the computer may be carried by the cabinet and may include a display 18, and keyboard 20, a processing unit (not shown) including or associated with a memory device, and the like. Alternatively, the computer or at least the processing unit may be remote from the cabinet body, but may be associated with and in communication with the cabinet body and the drawers so as to control access to the plurality of medications.

In accordance with an embodiment of the present invention, at least one of the plurality of drawers 16 of the medication dispensing cabinet 10 may include a conveyor belt 22 disposed within the drawer and a plurality of carriers operably connected to the conveyor belt for movement therewith. The carriers, in turn, may be configured to carry medication such that controlled movement of the conveyor belt causes the medication to be similarly moved in a controlled fashion, thereby facilitating the dispensing of the medication. One embodiment of a drawer assembly in accordance with an embodiment of the present invention is shown in FIG. 2. While a drawer assembly may include a single conveyor belt with associated carriers, the drawer assembly of the illustrated embodiment includes a plurality of conveyor belts that each define a distinct path of movement. In this embodiment, each of the plurality of conveyor belts may be the same size or the conveyor belts may have different sizes, as shown in FIG. 2.

Each conveyor belt 22 extends about two or more posts 24 and is driven, such as by means of rotation of the posts, so as to advance along its predefined endless path. In the illustrated embodiment in which the conveyor belt extends about two posts, the conveyor belt is advanced along a path that extends in opposed directions, that is, down and back, relative to the posts. However, in instances in which the conveyor belt extends about three or more posts, the conveyor belt may be advanced in such a fashion as to define a more complex path.

The conveyor belt 22 may be driven or advanced in various fashions. For example, at least one of the posts 24 about which the conveyor belt extends may be driven by motor, such as a DC motor, either directly or via a gear assembly or other linkage. The motor of this embodiment may, in turn, be actuated by the computer such that the computer controls the motion of the conveyor belt. In one embodiment, the computer may control the motor such that the conveyor belt may be controllably advanced in either of two opposed directions, such as a first clockwise direction or a second opposed counterclockwise direction.

The drawer assembly also includes a plurality of carriers operably connected to the conveyor belt 22 for movement with the conveyor belt. The carriers may be configured to carry medication for movement with the conveyor belt. In this regard, the carriers of embodiments of the present invention are configured to carry the medication as opposed to pushing the medication. Accordingly, the carriers limit the movement of the medication in a direction away from the conveyor belt so as to prevent contact between the medication and the drawer 16. Thus, the carriers prevent the medication from being pinched, jammed or wedged against the floor 32 or the wall 34 of the drawer. Additionally, the carriers reduce or eliminate erosion of the medication and reduce or eliminate rubbing and other wear of a label carried by the medication.

The carriers may be embodied in a number of different manners. In the embodiment shown in FIGS. 2-4, the plurality of carriers include a plurality of bins 26. Each bin is operably connected to the conveyor belt 22, such as by means of a cleat carried by one of the bin or the conveyor belt, a yoke carried by the other of the bin or the conveyor belt and a pin, threaded fastener or the like that serves to interconnect the cleat and the yoke. For purposes of illustration, FIG. 3 is a perspective view of one of the conveyor belts and the associated bins from the drawer assembly of FIG. 2 with only a portion of the floor 32 of the drawer 16 being illustrated. Additionally, FIG. 4 is a perspective view of the conveyor belt and associated bins of FIG. 3, albeit looking upwardly at the conveyor belt and the associated bins. In order to illustrate the conveyor belt and the associated bins in FIG. 4, the floor of the drawer is not depicted.

In the embodiment of FIGS. 2-4 in which the conveyor belt 22 extends about two or more upstanding posts 24, the bins 26 are also upstanding and extend laterally out from the conveyor belt. The bins of this embodiment include a support surface 28, such as a floor, and a wall 30 extending outwardly, such as upwardly, from the support surface and circumferentially about the support surface. As such, the bins define an internal cavity that is configured to receive the medication. The bins may also include a lid in order to fully enclose the cavity in which the medication is disposed. However, in an embodiment in which the bin is positioned in a generally upstanding configuration such that the open end of the bin (opposite the support surface) is at the upper end of the bin, the bin generally need not include a lid since the medication is generally maintained proximate the support surface of the bin as a result of gravitational forces. The bins of the illustrated embodiment have a rectangular shape. However, the bins may have other shapes if so desired. Additionally, the bins of the illustrated embodiment are identical with the same shape and size. However, the bins may have different shapes and sizes in other embodiments, particularly in instances in which the bins are to carry different types of medications, different quantities of medications and/or differently packaged medications.

By carrying the medication within a bin 26, the support surface 28, such as a floor, of a respective bin is configured to limit movement of the medication as a result of gravitational forces and the wall 30 of the respective bin is configured to limit movement of the medication as a result of centrifugal forces. As such, the medication does not come into contact with the drawer 16, such as either the floor 32 or the walls 34 of the drawer and, accordingly, erosion of the medication, wear of a label carried by the medication or pinching, jamming or binding of the medication against the floor or wall of the drawer is eliminated.

Each bin 26 or other carrier that is operably connected to a conveyor belt 22 may include the same type of medication or different types of medication. Even if each bin or other carrier includes the same type of medication, each bin may include either the same quantity of the medication, such as a unit dose or single dose of the medication, or different quantities of the medication. In order to uniquely identify the bins or other carriers and as a result, to facilitate tracking of the medication carried by the bins or other carriers, each bin or other carrier may be associated with the unique identifier. For example, each bin or other carrier may carry a bar code or other designation that uniquely identifies the respective bin or other carrier. During restocking or replenishment operations, the computer may be provided with information identifying a respective bin or other carrier and the medication that is to be carried thereby. For example, a user may scan a bar code carried by a bin and may also scan a bar code carried by or otherwise associated with the medication that is being placed within the carrier, thereby uniquely identifying the bin and also identifying the type and quantity of medication that is placed within the bin. Based on this information, the computer can maintain a record of the bins and their contents. The computer may also be informed of the sequence of bins or other carriers that are carried by the conveyor belt 22 and may also be informed of the current location of the conveyor belt and/or the bins or other carriers carried by the conveyor belt so that the computer can determine the position of each bin or other carrier within the drawer assembly. For example, the drawer assembly may include a sensor for reading the bar code or other unique identifier carried by a bin that is currently located at a predefined position within the drawer 16. Based upon a predetermined sequence in which the bins are carried by the conveyor belt and the identity of the bin that is located at the predefined position relative to the sensor, the computer may determine the location of each bin within the drawer.

As shown in FIG. 3, the drawer 16 may define an opening 36 and the conveyor belt 22 may be configured to position a respective bin 26 in alignment with the opening. In the illustrated embodiment, the support surface 32, such as the floor, of the drawer may define the opening. However, in other embodiments, the wall 34 of the drawer, including the front face of the drawer, or an upper surface or cover of the drawer may define the opening. In the embodiment illustrated in FIGS. 3 and 4, however, the conveyor belt may be rotated until a bin carrying the medication to be dispensed is aligned with the opening, such as by overlying the opening. The medication may then be discharged from the bin through the opening. In order to discharge the medication, the support surface 28, such as the floor, of the bin that is aligned with the opening may be opened so that the medication falls through the opening. The support surface of the bin may be configured to be opened in various manners.

In one embodiment, the support surface 28 of the bin 26 may be biased so as to open in the absence of countervailing forces that otherwise maintain the support surface in a closed position. For example, the bin may include a spring that is configured to bias or urge the support surface of the bin to an open position. While the bin is carried by the conveyor belt 22 along the predefined path of travel of the conveyor belt, the support surface of the bin may ride upon or otherwise be operably engaged by the floor 32 of the drawer 16 such that the support surface of the bin remains closed. Once the bin is aligned with the opening 36 defined by the floor of the drawer, however, the support surface of the bin will be biased into an open position since the countervailing forces otherwise provided by the floor of the drawer are not present. Once the medication has been discharged, the conveyor belt may be further rotated and the support surface of the bin that had been biased into an open position while the bin was in alignment with the opening defined by the floor of the drawer may be guided or folded into the closed position by the engagement of the support surface of the bin with the floor of the drawer proximate the opening.

Alternatively, the support surface 28 of the bin 26 may be biased, such as by a spring, into a closed position. In this embodiment, even in an instance in which the bin is aligned with the opening 36 defined by the floor 32 of the drawer 16, the support surface of the bin will not open merely as a result of gravitational forces. Instead, the bin and/or the drawer may include an actuator, such as a solenoid-driven actuator, for applying force to the support surface of the bin so as to overcome the bias force that otherwise maintains the support surface of the bin in a closed position and to urge the support surface of the bin to an open position such that the medication within the bin may be discharged through the opening. While the actuator may be automatically actuated in response to the alignment of a bin with the opening defined by the floor of the drawer, the actuator may, instead, be actuated by the computer following the alignment of a desired bin with the opening defined by the floor of the drawer such that the computer controls not only the relative position of the bins as a result of the controlled movement of the conveyor belt 22, but also the dispensation of the medication from the respective bins through the opening defined by the floor of the drawer. Following dispensation of the medication in this embodiment, the actuator may be deactuated such that the bias force that otherwise maintains the support surface of the bin in a closed position causes the support surface of the bin to be closed, thereby facilitating subsequent movement of the conveyor belt and the bins carried by the conveyor belt.

Once dispensed through the opening 36 defined by the floor 32 of the drawer 16, the medication may be accessed, such as by a medical provider. In one embodiment in which the medication dispensing cabinet 10 includes a plurality of drawers, the opening defined by the floor of the drawer may open into a second drawer, such as a lower drawer positioned immediately below the drawer assembly that includes the conveyor belts 22 and the plurality of carriers carried by the conveyor belts. In this embodiment, both drawers, that is, both the drawer assembly and the second drawer, may be locked while the medication is dispensed from the drawer assembly through the opening defined by the floor of the drawer into the second drawer. Thereafter, once the medication has been dispensed and is resident within the second drawer, the computer may direct that the second drawer be unlocked and, in some embodiments, may signal the medical provider that the medication is now accessible within the second drawer. The medical provider may then open the second drawer, such as by slidably extending the second drawer from the cabinet body 12 and may retrieve the medication. The second drawer may then be closed and may again be locked to facilitate subsequent dispensing of other medication.

In one embodiment, multiple medications may be dispensed into the second drawer prior to unlocking the second drawer and permitting the medical provider to retrieve the medications. For example, in an instance in which a patient's prescription includes several medications that are stored in respective bins 26 of the drawer assembly, the computer may direct that the various bins that include the prescribed medications be placed in alignment with the opening(s) 36 defined by the floor 32 of the drawer assembly and dispensed to the second drawer. This dispensing process may occur sequentially, such as in an instance in which the various medications are carried by different bins on a common conveyor belt 22 or may occur concurrently in an instance in which the various medications are carried by bins that, in turn, are carried by different conveyor belts, such as the plurality of conveyor belts shown, for example, in the embodiment of FIG. 2. In this embodiment, the floor of the drawer assembly may include a plurality of openings, one of which is aligned with a bin carried by each of the conveyor belts. As such, the computer may direct that the appropriate bins carried by the various conveyor belts be aligned with the respective openings defined by the floor of the drawer assembly such that the various medications carried by those bins are dispensed concurrently into the second drawer for subsequent retrieval by the medical provider.

Referring to the embodiment of FIG. 2, it is noted that the second drawer may be sized differently than the overlying drawer assembly, such as being either wider or narrower than the drawer assembly. In the embodiment of FIG. 3, for example, the second drawer may be narrower than the drawer assembly such that a plurality of second drawers are positioned immediately below the drawer assembly with some of the openings 36 defined by the drawer assembly opening into one of the second drawers and the other openings defined by the drawer assembly opening into the other second drawer. As such, an embodiment that includes multiple second drawers that are positioned in alignment with and immediately below different portions of the drawer assembly may provide increased control over the access to the medications that are dispensed since each of the second drawers may be controllably locked and unlocked, such as by the computer.

As described above, the computer may direct the movement of the conveyor belt 22 and the carriers, such as the bins 26, carried by the conveyor belt. In one embodiment, the computer may control the direction of movement of the conveyor belt since the conveyor belt of this embodiment is configured to move in either direction. Based upon the relative location of the carrier that carries the medication to be dispensed relative to the opening 36 through which the medication is to be dispensed, the computer may control the direction of movement of the conveyor belt so that the carrier that carries the medication to be dispensed moves the shortest distance prior to being brought into alignment with the opening. For example, if the carrier that carries the medication to be dispensed is positioned one position removed from the opening in a clockwise direction, the computer of this embodiment may direct the conveyor belt to move one position in a counterclockwise position so as to move the desired carrier into alignment with the opening as opposed to moving the conveyor belt in the clockwise direction which would require more movement and a longer time to bring the desired carrier into alignment with the opening.

In the above described embodiment, the drawer 16 defines one or more openings 36 in the floor 32 through which medication may be dispensed, such as by gravity feed. However, other portions of the drawer may define an opening or a window through which medications may be dispensed. For example, the front face of the drawer may define one or more windows through which medication may be dispensed. Alternatively, as shown in FIG. 5, the drawer may include a cover 38 that extends between opposed side walls 34 to prevent general access to the contents of the drawer. As will be noted, a portion of the cover has been removed in FIG. 5 to permit the interior of the drawer to be viewed. The cover may define one or more openings 40 through which medication within the drawer may be dispensed. In this regard, each window may include a door 42 that is generally in a closed position. Once the medication is in position to be dispensed, however, the door may be unlocked such that a medical provider may open the door (if the door is not otherwise biased into an open position) and retrieve the medication through the respective opening. As such, the drawer assembly may include a lock or latch associated with each door so as to control access via the respective openings. As will be noted, the openings defined by the cover and, in turn, the doors that extend over the openings may either have the same size and shape or may be differently sized and shaped depending, for example, upon the size and shape of the medication to be dispensed via the respective openings.

Within the drawer 16 of this embodiment, the drawer assembly may include a conveyor belt 22 and a plurality of carriers operably connected to the conveyor belt. For purposes of illustration, the carriers are not illustrated in FIG. 5. It is to be understood, however, that the conveyor belts of the drawer assembly of FIG. 5 would also include carriers, such as shown in FIG. 6 and described below. In this regard, the drawer assembly may include various types of carriers including bins 26 in which medication is disposed or carriers that directly connect to or engage medication, such as clips 44 for directly engaging a syringe 46 or the like. The conveyor belt and associated carriers of FIG. 6 are positioned within the drawer so as to present a selected medication to a respective opening 40 defined by the cover 38. In this regard, the conveyor belt may be positioned within the drawer so that a selected carrier carried by the conveyor belt may be placed in alignment with the respective opening.

Since different portions of the drawer 16, such as the cover 38, may define the openings 40 in this embodiment, however, the conveyor belt 22 may be oriented differently relative to that described above in conjunction with the embodiments illustrated in FIGS. 2-4. For example, in the embodiment illustrated in FIGS. 5 and 6 in which the cover defines respective openings through which the medication is dispensed, the conveyor belt may be disposed such that the carriers generally face upwards or downwards as the conveyor belt moves forwardly and rearwardly through the drawer. In order to prevent medication stored within bins 26 carried by the conveyor belt from inadvertently falling out of the bins when the bins are facing downward, the bins may include a lid 48 as shown in FIG. 6. A lid may be biased to a closed position and, in one embodiment, may be locked or latched in the closed position. Once the conveyor belt positions a respective bin in alignment with the corresponding opening, a medical provider may open the door 42 and, in turn, open the lid and access the medication prior to closing the lid and the door such that the conveyor belt may further circulate the bin along the path of travel defined by the conveyor belt. In an instance in which the lid of the bin is locked or latched, the lid may be unlocked, such as by direction of the computer, once the bin has been positioned in alignment with the opening for dispensation of the medication carried by the bin.

By carrying the medication, such as within respective bins 26, the medication dispensing cabinet 10 and associated medication dispensing drawer assembly of embodiments of the present invention prevent contact between the medication and the drawer 16 or, more particularly, the floor 32, wall 34 or other fixed partitions, dividers, or the like within the drawer. As such, the medication dispensing cabinet and associated medication dispensing drawer assembly of embodiments of the present invention may advantageously reduce or eliminate errosion of the medication including a corresponding reduction or elimination of wear to a label carried by the medication. In addition, the medication dispensing cabinet and associated medication dispensing drawer assembly of embodiments of the present invention advantageously prevent instances in which the medication may otherwise be pinched, wedged or jammed relative to a drawer, such as a floor, wall or other fixed partition, divider or the like of the drawer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A medication dispensing cabinet comprising:

a cabinet body;

a plurality of drawers disposed within and configured for slideable extension relative to the cabinet body;

a conveyor belt disposed with a first drawer;

a plurality of bins operably connected to the conveyor belt and configured to receive medication for movement with the conveyor belt, wherein each bin comprises an openable support surface, wherein the first drawer defines an opening and the conveyor belt is configured to move a respective bin into alignment with the opening by moving the respective bin in either a first direction or an opposite second direction depending upon the direction in which the respective bin is most nearly proximate to the opening such that the support surface of the respective bin is permitted to open and the medication carried by the respective bin is dispensed through the opening to a second drawer, wherein the conveyor belt is configured to move the respective bin relative to the first drawer following dispensing of the medication such that the first drawer guides the support surface of the respective bin to a closed position as a result of engagement of the support surface of the respective bin by a portion of the first drawer proximate the opening, and wherein the second drawer is configured to secure the medication.

2. A medication dispensing cabinet according to claim 1 wherein each bin further comprises a wall extending outwardly from and circumferentially about the support surface to thereby define a cavity that is configured to receive the medication.

3. A medication dispensing cabinet according to claim 1 wherein the support surface is biased to open.

4. A medication dispensing cabinet according to claim 1 further comprising a plurality of conveyor belts disposed within the first drawer.

5. A medication dispensing cabinet according to claim 1 wherein the plurality of drawers comprise the second drawer adjacent to the first drawer, and wherein the opening defined by the first drawer opens into the second drawer such that medication dispensed through the opening is collected within the second drawer.

6. A medication dispensing cabinet according to claim 1 further comprising a computer configured to cause the conveyor belt to be moved in a respective one of the first or second directions such that the respective bin is moved to a nearest proximity, wherein the nearest proximity is configured as a shortest distance into alignment with the opening.

7. A medication dispensing drawer assembly comprising:

a drawer comprising a support surface and a wall extending outwardly from the support surface;

a conveyor belt disposed within the drawer; and a plurality of carriers operably connected to the conveyor belt for movement therewith, wherein the carriers are configured to carry medication for movement with the conveyor belt and to limit movement of the medication in a direction away from the conveyor belt to prevent contact between the medication and the drawer, and wherein each carrier comprises an openable support surface, wherein the drawer defines an opening and the conveyor belt is configured to move a respective carrier into alignment with the opening by moving the respective bin in either a first direction or an opposite second direction depending upon the direction in which the respective carrier is most nearly proximate to the opening such that the support surface of the respective carrier is permitted to open and the medication carried by the respective carrier is dispensed through the opening to a second drawer, and wherein the conveyor belt is configured to move the respective carrier relative to the drawer following dispensing of the medication such that the drawer guides the support surface of the respective carrier to a closed position as a result of engagement of the support surface of the respective carrier by a portion of the drawer proximate the opening, and wherein the second drawer is configured to secure the medication.

8. A medication dispensing drawer assembly according to claim 7 wherein the plurality of carriers comprise a plurality of bins.

9. A medication dispensing drawer assembly according to claim 8 wherein each bin further comprises a wall extending outwardly from and circumferentially about the support surface of the respective bin to thereby define a cavity that is configured to receive the medication.

10. A medication dispensing drawer assembly according to claim 9 wherein the support surface of the respective bin is configured to limit movement of the medication as a result of gravitational forces and the wall of the respective bin is configured to limit movement of the medication as a result of centrifugal forces.

11. A medication dispensing drawer assembly according to claim 9 wherein the support surface of the respective bin is biased to open.

12. A medication dispensing cabinet comprising:

a cabinet body;

a plurality of drawers including first and second drawers disposed within and configured for slideable extension relative to the cabinet body;

a conveyor belt disposed with the first drawer; and a plurality of bins operably connected to the conveyor belt for movement therewith, wherein each bin comprises an openable support surface and a wall extending outwardly from the support surface to thereby define a cavity that is configured to receive medication for movement with the conveyor belt, wherein the first drawer defines an opening and the conveyor belt is configured to move a respective bin into alignment with the opening by moving the respective bin in either a first direction or an opposite second direction depending upon the direction in which the respective bin is most nearly proximate to the opening such that the support surface of the respective bin is permitted to open and the medication carried by the respective bin is dispensed through the opening, wherein the second drawer is adjacent to the first drawer, wherein the opening defined by the first drawer opens into the second drawer such that medication dispensed through the opening is collected within the second drawer, wherein the second drawer is configured to be locked while the medication is dispensed into the second drawer and unlocked following dispensing of the medication into the second drawer.

13. A medication dispensing cabinet according to claim 12 wherein the wall of each bin extends circumferentially about the support surface.

14. A medication dispensing cabinet according to claim 13 wherein the support surface is configured to limit movement of the medication as a result of gravitational forces and the wall is configured to limit movement of the medication as a result of centrifugal forces.

15. A medication dispensing cabinet according to claim 14 wherein the first drawer comprises a support surface and a wall extending outwardly from the support surface of the first drawer, and wherein each bin is configured to limit movement of the medication in a direction away from the conveyor belt to prevent contact between the medication and the first drawer.

16. A medication dispensing cabinet according to claim 12 wherein the support surface of the respective bin is biased to open.

17. A medication dispensing cabinet according to claim 12 further comprising a plurality of conveyor belts disposed within the first drawer and a plurality of sets of bins, wherein each set of bins includes a plurality of bins connected to a respective conveyor belt, wherein the first drawer defines a plurality of opening with each opening associated with a respective conveyor belt, and wherein the plurality of drawers comprises a plurality of second drawers adjacent to the first drawer with each second drawer positioned such that a respective opening defined by the first drawer opens thereinto.

* * * * *